United States Patent
Kai et al.

(10) Patent No.: US 11,637,351 B2
(45) Date of Patent: *Apr. 25, 2023

(54) POROUS FILM, SEPARATOR FOR RECHARGEABLE BATTERY, AND RECHARGEABLE BATTERY

(71) Applicant: Toray Industries, Inc., Tokyo (JP)

(72) Inventors: Nobuyasu Kai, Otsu (JP); Kei Ikoma, Nasushiobara (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 358 days.

This patent is subject to a terminal disclaimer.

(21) Appl. No.: 16/472,491

(22) PCT Filed: Feb. 15, 2018

(86) PCT No.: PCT/JP2018/005159
§ 371 (c)(1),
(2) Date: Jun. 21, 2019

(87) PCT Pub. No.: WO2018/155287
PCT Pub. Date: Aug. 30, 2018

(65) Prior Publication Data
US 2020/0099031 A1    Mar. 26, 2020

(30) Foreign Application Priority Data
Feb. 23, 2017 (JP) .............................. JP2017-031749

(51) Int. Cl.
| | |
|---|---|
| H01M 50/454 | (2021.01) |
| H01M 50/491 | (2021.01) |
| H01M 50/414 | (2021.01) |
| H01M 50/423 | (2021.01) |
| H01M 50/451 | (2021.01) |
| H01M 50/489 | (2021.01) |

(52) U.S. Cl.
CPC ....... *H01M 50/454* (2021.01); *H01M 50/414* (2021.01); *H01M 50/423* (2021.01); *H01M 50/451* (2021.01); *H01M 50/491* (2021.01); *H01M 50/489* (2021.01)

(58) Field of Classification Search
CPC combination set(s) only.
See application file for complete search history.

(56) References Cited

U.S. PATENT DOCUMENTS

| | | | |
|---|---|---|---|
| 6,447,958 B1 * | 9/2002 | Shinohara | H01M 50/449 429/251 |
| 2005/0019665 A1 * | 1/2005 | Adachi | B01D 65/102 428/220 |
| 2008/0076017 A1 * | 3/2008 | Takezawa | H01M 4/386 429/129 |
| 2011/0171513 A1 * | 7/2011 | Kuze | H01M 50/443 429/144 |

FOREIGN PATENT DOCUMENTS

| | | |
|---|---|---|
| JP | 31-75730 B | 4/2001 |
| JP | 2002-270550 A | 9/2002 |
| JP | 2003-086162 A | 3/2003 |
| JP | 2009-070609 A | 4/2009 |
| JP | 2011-192529 A | 9/2011 |
| JP | 2011192529 A * | 9/2011 |
| JP | 5183435 B2 | 4/2013 |
| JP | 2014-198832 A | 10/2014 |
| JP | 2015-017241 A | 4/2015 |
| JP | 2016-172426 A | 9/2016 |

OTHER PUBLICATIONS

English translation of JP-2011192529-A (Year: 2011).*

* cited by examiner

*Primary Examiner* — Ula C Ruddock
*Assistant Examiner* — Sarika Gupta
(74) *Attorney, Agent, or Firm* — DLA Piper LLP (US)

(57) ABSTRACT

At low cost, a porous film has high thermal film rupture resistance and outstanding battery characteristics. The porous film has a porous layer on at least one surface of a porous substrate, and if the surface porosity of the porous layer is defined as α and the cross-sectional void ratio of the porous layer is defined as β, then α/β does not exceed 90%.

11 Claims, No Drawings

POROUS FILM, SEPARATOR FOR RECHARGEABLE BATTERY, AND RECHARGEABLE BATTERY

TECHNICAL FIELD

This disclosure relates to a porous film, a separator for secondary batteries, and a secondary battery.

BACKGROUND ART

Secondary batteries such as lithium ion batteries are widely used for portable digital devices such as smartphones, tablets, mobile phones, laptop PCs, digital cameras, digital video cameras, and portable game consoles; portable apparatuses such as electric tools, electric bikes, and electric assisted bicycles; and automotive applications such as electric vehicles, hybrid vehicles, and plug-in hybrid vehicles.

In general, a lithium ion battery contains a positive electrode formed by laying a positive electrode active material on a positive electrode collector and a negative electrode formed by laying a negative electrode active material on a negative electrode collector, with a secondary battery separator and an electrolyte interposed between them.

A polyolefin based porous base is used in the secondary battery separator. Features required of these secondary battery separators include having a porous structure containing an electrolyte to permit ion migration and having a shutdown property that allows power generation to be stopped in the event of abnormal heat generation in a lithium ion battery by undergoing thermal melting so that the porous structure will be closed to halt the ion migration.

As lithium ion batteries with larger capacities and larger output are developed in recent years, however, secondary battery separators are now required to have higher safety characteristics in addition to the above features. If abnormal heat generation occurs in a lithium ion battery, the secondary battery separator can be broken as a result of further heating of the battery after actuation of the shutdown property described above. A secondary battery separator can also be broken as a result of heat generation under local pressure that occurs when a lithium ion battery receives an impact. If there occurs such breakage of a secondary battery separator, a short circuit can take place in the battery to cause burning or bursting of the battery. Thus, a secondary battery separator is required to have resistance to thermal breakage at high temperatures in addition to the shutdown property.

On the other hand, a lithium ion battery is also required to have excellent battery characteristics to permit larger output and longer life, making it necessary to develop a secondary battery separator having good battery characteristics without undergoing a decline in battery characteristics that may occur as a result of enhancing safety property.

To meet these requirements, Japanese Patent No. 5183435 proposes a secondary battery separator that includes a polyolefin based porous film coated with a porous layer containing inorganic particles to ensure a reduction in the degree of heat shrinkage. In addition, Japanese Patent No. 3175730 proposes a secondary battery separator having high heat resistance and a high short-circuiting temperature that is produced by coating a porous base with a heat resistant nitrogen-containing aromatic polymer and ceramic powder.

However, although the degree of heat shrinkage is reduced by using inorganic particles in Japanese Patent No. 5183435, both the inorganic particle-containing porous layer and the polyolefin in the base material can easily undergo thermal breakage when the temperature reaches a high region after shutdown, thereby failing to maintain adequate safety. In Japanese Patent No. 3175730, furthermore, a heat resistant nitrogen-containing aromatic polymer is used for coasting to realize a high resistance to thermal breakage, but the heat resistant nitrogen-containing aromatic polymer accounts for a large proportion and the inorganic particles are small in particle diameter, leading to a large degree of deterioration in battery characteristics and a rise in cost.

Thus, it could be helpful to provide, at low cost, a porous film having both a high resistance to thermal breakage and good battery characteristics.

SUMMARY

We thus provide low cost porous film having both a high resistance to thermal breakage and good battery characteristics made possible by using a porous layer having a surface hole area rate α that is 50% or less of the cross-sectional porosity β of the porous layer.

The porous film is configured as described below:
(1) A porous film including a porous base having a porous layer at least on one side, the porous layer having an α/β ratio of 90% or less wherein α is the surface hole area rate and β is the cross-sectional porosity of the porous layer.
(2) A porous film as set forth in (1), wherein the proportion of α/β is 50% or less.
(3) A porous film as set forth in either (1) or (2), wherein the porous layer has a surface hole area rate α of 35% or less.
(4) A porous film as set forth in any one of (1) to (3), wherein the porous layer has a cross-sectional porosity β of 40% or more and 80% or less.
(5) A porous film as set forth in any one of (1) to (4), wherein the porous layer contains a heat resistant resin.
(6) A porous film as set forth in (5), wherein the heat resistant resin is at least one resin selected from the group consisting of polyamide, polyamide-imide, and polyimide.
(7) A porous film as set forth in either (5) or (6), wherein the heat resistant resin contains aromatic polyamide having a structure as represented by formula (1).

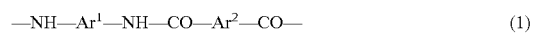

$$—NH—Ar^1—NH—CO—Ar^2—CO— \qquad (1)$$

wherein $Ar^1$ and $Ar^2$ each represent an aromatic group.
(8) A porous film as set forth in any one of (1) to (7), wherein the porous layer contains inorganic particles.
(9) A porous film as set forth in any one of (5) to (8), wherein the heat resistant resin accounts for 1 mass % or more and less than 50 mass % in 100 mass % of the porous layer.
(10) A porous film as set forth in any one of (1) to (9), wherein the heat resistant resin has an intrinsic viscosity (η) of 2.0 dl/g or more and 8.0 dl/g or less.
(11) A secondary battery separator including a porous film as set forth in (1) to (10).
(12) A secondary battery including a secondary battery separator as set forth in (11).

We permit low cost provision of a porous film having both a high resistance to thermal breakage and good battery characteristics, which is made possible by using a porous layer having a surface hole area rate α that is 50% or less of the cross-sectional porosity β of the porous layer. The use of the porous film makes it possible to provide a secondary battery characterized by a high capacity, high output, long life, and low cost.

DETAILED DESCRIPTION

The porous film includes a porous base having a porous layer at least on one side, the porous layer having an α/β ratio of 50% or less wherein α is the surface hole area rate and β is the cross-sectional porosity of the porous layer. Our previous films, battery separators, and batteries are described in more detail below.

Porous Layer
Porous Structure

The porous structure in the porous layer has an α/β ratio of 90% or less wherein α is the surface hole area rate of the porous layer and β is the cross-sectional porosity of the porous layer. The quotient of α/β means the ratio of the surface hole area rate to the porosity of the entire porous layer. α represents the resistance to thermal breakage whereas β represents the battery characteristics and accordingly, the ratio shows the balance between the resistance to thermal breakage and the battery characteristics. It is preferably 70% or less, more preferably 50% or less, still more preferably 30% or less, and particularly preferably 20% or less. If the surface hole area rate α of the porous layer is larger than 90% of the cross-sectional porosity β of the porous layer, a sufficiently large resistance to thermal breakage cannot be realized in some instances.

The surface hole area rate α of the porous layer is preferably 35% or less. It is more preferably 30% or less and still more preferably 20% or less. If the surface hole area rate α is larger than 35%, a sufficiently large resistance to thermal breakage cannot be realized in some instances.

The cross-sectional porosity β of the porous layer is preferably 40% or more and 80% or less. It is more preferably 45% or more and 70% or less, and still more preferably 50% or more and 65% or less. If the cross-sectional porosity β of the porous layer is less than 40%, a sufficiently large ion permeability cannot be realized in some instances, leading to deterioration in battery characteristics. If it is larger than 80%, a sufficiently large resistance to thermal breakage cannot be realized in some instances.

The surface hole area rate α and cross-sectional porosity β of a porous layer can be determined by the technique described below. Ion coating is carried out on the surface and cross section of the porous layer and field emission type scanning electron microscopy (FE-SEM) is performed to obtain image data of the surface and cross section. The image data obtained are analyzed and the area of open holes is calculated by subtracting the non-open portions from the entire image, thereby allowing the surface hole area rate α and the cross-sectional porosity β to be determined.

Heat Resistant Resin

A heat resistant resin has a melting point at 150° C. or more or showing substantially no melting point. The melting point is determined by first heating and cooling a specimen in a differential scanning calorimeter (DSC) and heating it for the second time while measuring the temperature at the top of the endothermic peak. A resin having a melting point at 150° C. or more is one that shows such a peak top at 150° C. or more whereas a resin having no melting point is one that gives no such peak top in the measuring temperature range of −20° C. to 230° C. From the viewpoint of improving the resistance to thermal breakage, it is preferable for such a resin to contain a heat resistant resin such as, for example, polyamide, polyamide-imide, polyimide, polyetherimide, polyvinylidene fluoride, vinylidene fluoride-hexafluoropropylene copolymer, polytetrafluoroethylene, polysulfone, polyketone, polyether ketone, polycarbonate, and polyacetal. Among others, it is preferable that the heat resistant resin is at least one resin selected from the group consisting of polyamide, polyamide-imide, and polyimide. It is more preferable that the heat resistant resin is aromatic polyamide, aromatic polyamide-imide, or aromatic polyimide, and it is still more preferable that the heat resistant resin is aromatic polyamide.

Examples of the aromatic polyamide include meta-oriented aromatic polyamide and para-oriented aromatic polyamide. Either may be used, but para-oriented aromatic polyamide is preferable because the porous layer will have a larger strength and resistance to thermal breakage.

A para-oriented aromatic polyamide is produced by polymerization of para-oriented aromatic diamine and para-oriented aromatic dicarboxylic halide and has a main backbone that includes a repeating unit as represented by chemical formula (1) and/or chemical formula (2).

Furthermore, $Ar^1$, $Ar^2$, and $Ar^3$ each may be, for example, one represented by chemical formulae (3) to (7). Examples of X and Y in chemical formulae (6) and (7) include, but not limited to, —O—, —CO—, —SO$_2$—, —CH$_2$—, —S—, and —C(CH$_3$)$_2$—.

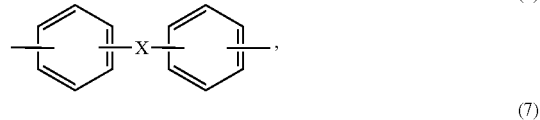

Specific examples of aromatic diamine include, but not limited to, paraphenylene diamine, 4,4'-diaminodiphenyl ether, 3,4'-diaminodiphenyl ether, 4,4'-diaminobenzophenone, 3,3'-diaminobenzophenone, 2-chloro-1,4-phenylene diamine, 1-5'-naphthalene diamine, and 4, 4'-diaminodiphenyl sulfone.

In addition, specific examples of aromatic dicarboxylic halide include, but are not limited to, terephthalic acid chloride, 2-chloroterephthalic acid chloride, isophthalic acid chloride, 2-chloroisophthalic acid chloride, and 2,6'-naphthalene dicarboxylic acid chloride.

The heat resistant resin preferably contains aromatic polyamide having a structure as represented by formula (1).

where $Ar^1$ and $Ar^2$ each represent an aromatic group.

In the aromatic polyamide, it is preferable that aromatic groups having ether groups account for 5 mol % or more and 80 mol % or less of the $Ar^1$ groups in chemical formula (1). They more preferably account for 7 mol % or more and 60 mol % or less, and still more preferably 10 mol % or more and 40 mol % or less. If such aromatic groups having ether groups account for only less than 5 mol %, sufficiently developed porous structures will not be present in some instances, leading to deterioration in battery characteristics. If it is larger than 80 mol %, a sufficiently large resistance to thermal breakage cannot be realized in some instances. In addition, the porous layer can be low in strength and a sufficiently large safety cannot be ensured in some instances. Furthermore, the porous layer may suffer from deformation and come off during the production process.

To determine the proportion of the aromatic groups having ether groups in $Ar^1$, first a porous film specimen is prepared by forming a porous layer on a porous base fixed on a metal frame, and 100 parts by mass of the specimen is immersed in 100 parts by mass of concentrated sulfuric acid at room temperature for 24 hours to recover the porous layer from the specimen. Subsequently, insoluble components (inorganic particles and the like) are removed by a centrifugal separator and the like, and the resin component is recovered and examined by a combination of chemical techniques (molecular weight analysis, mass analysis, magnetic nuclear resonance analysis, Fourier-transform infrared spectroscopy and the like), followed by calculation.

The aforementioned aromatic polyamide resin preferably has an intrinsic viscosity ($\eta$) of 2.0 dl/g or more and 8.0 dl/g or less. An increase in the intrinsic viscosity means an increase in the polymerization degree, or the molecular weight, of the aromatic polyamide resin, leading to improved heat-resistance of the aromatic polyamide resin. Accordingly, a secondary battery separator containing an aromatic polyamide resin with a high intrinsic viscosity can be sufficiently large in the resistance to thermal breakage. Thus, an intrinsic viscosity ($\eta$) of 2.0 dl/g or more, more preferably 2.5 dl/g or more, and still more preferably 3.6 dl/g or more, ensures a sufficiently large resistance to thermal breakage. Or, the quantity of the aromatic polyamide resin required to ensure a large resistance to thermal breakage can be decreased, thereby preventing an increase in air permeability and deterioration in battery characteristics due to a decrease in porosity. On the other hand, an excessive increase in intrinsic viscosity can cause a decrease in handleability during the polymerization step or a decrease in productivity in some instances. An intrinsic viscosity ($\eta$) controlled at 8.0 dl/g or less, more preferably 7.0 dl/g or less, and still more preferably 6.0 dl/g or less, can serve to prevent such a decrease in handleability during the polymerization step and a decrease in productivity. It also serves to prevent a decrease in solubility in solvents and coagulation of molecules of the aromatic polyamide resin, which may make the formation of porous film difficult.

In the aromatic polyamide, furthermore, it is preferable that at least part of the aromatic groups in $Ar^1$ and $Ar^2$ in chemical formula (1) are substituted by electron-withdrawing groups. It is preferable that 30 to 100 mol %, more preferably 50 to 100 mol %, of all aromatic groups are substituted by electron-withdrawing groups. An electron-withdrawing group is one having an electronegativity of 2.5 or more. Examples of the electron-withdrawing group include halogen groups such as fluoro group, chloro group, and bromo group; halogenated alkyl groups such as trifluoromethyl group; and others such as nitro group, cyano group, cyanate group, and phenyl group.

Inorganic Particles

The porous layer preferably contains inorganic particles. If the porous layer contains inorganic particles, they serve to realize dimensional stability at high temperatures and prevent short circuits from being caused by foreign objects.

Specific examples of the inorganic particles include inorganic oxide particles such as aluminum oxide, boehmite, silica, titanium oxide, zirconium oxide, iron oxide, and magnesium oxide; inorganic nitride particles such as aluminum nitride and silicon nitride; and insoluble ion crystal particles such as calcium fluoride, barium fluoride, and barium sulfate. Of these, one type of particles may be used singly, or two or more types of particles may be used as a mixture.

It is preferable that the inorganic particles have an average particle diameter of 0.10 µm or more and 5.0 µm or less. It is more preferably 0.20 µm or more and 3.0 µm or less, and still more preferably 0.30 µm or more and 1.0 µm or less. If it is less than 0.10 µm, the porous layer will be too dense in some instances, possibly leading to a high air permeability. Furthermore, the pore size will be small and accordingly the electrolyte impregnatability will be low in some instances, possibly leading to an influence on the productivity. If it is less than 5.0 µm, an adequate dimensional stability will not be realized or the porous layer will be too thick in some instances, possibly leading to deterioration in battery characteristics.

The particles to use may have any appropriate shape such as spherical, plate-like, needle-like, rod-like, and elliptic. In particular, it is preferable for them to be spherical from the viewpoint of surface modification, dispersibility, and coatability.

Formation of Porous Layer

The porous film can be obtained by a method designed to produce a porous film that includes a porous base having a porous layer at least on one side, the porous layer having an $\alpha/\beta$ ratio of 50% or less wherein $\alpha$ is the surface hole area rate and $\beta$ is the cross-sectional porosity of the porous layer. A good method is described below.

When aromatic polyamide is adopted as the heat resistant resin, diamine and acid dichloride are used as starting materials to produce aromatic polyamide by a generally known production method such as solution polymerization and it is dispersed in a solvent together with inorganic particles to prepare a coating solution. Solvents useful for the dispersion include aprotic organic polar solvents such as N-methyl-2-pyrrolidone, N,N-dimethyl acetamide, dimethyl formamide, and dimethyl sulfoxide. Of these, N-methyl-2-pyrrolidone is particularly preferable from the viewpoint of the formation of a porous structure in a subsequent step.

To further increase the porosity, a poor solvent for aromatic polyamide may be added. In particular, the addition of water is preferable, and it is preferable for the water to account for 500 parts by mass or less relative to 100 parts by mass of the aromatic polyamide. If more than 500 parts by mass of water is added, problems such as the coagulation of aromatic polyamide in the coating solution can occur in some instances, possibly leading to insufficient stability of the coating material.

In addition to the aromatic polyamide and inorganic particles, the coating solution may additionally contain organic resins such as fluorine resin, acrylic resin, olefin resin, and polyvinyl pyrrolidone in order to increase the adhesiveness to the electrode. Examples of the fluorine resin to add include homopolymeric ones such as polyvinylidene fluoride, polytetrafluoroethylene, polyvinyl fluoride, and polychlorotrifluoroethylene, and copolymers such as ethylene-tetrafluoroethylene polymer and ethylene-chlorotrifluoroethylene polymer. The examples also include copolymers of homopolymeric resins with tetrafluoroethylene, hexafluoropropylene, trifluoroethylene and the like. Of these fluorine resins, polyvinylidene fluoride based resins, such as a vinylidene fluoride-hexafluoropropylene copolymer in particular, are preferable from the viewpoint of having electric stability and oxidation resistance and from the viewpoint of having adhesiveness to electrodes due to the inclusion of acidic functional groups. An acidic functional group is one that can release a proton ($H^+$) and examples of the acidic functional group include carboxylic acid groups, sulfonic acid groups, phosphoric acid groups, hydroxyl groups, and phenolic hydroxyl groups. These may be used singly or as a combination of two or more thereof. The acidic functional group is particularly preferably a carboxylic acid group and examples of monomers having carboxylic acid groups include monocarboxylic acids such as acrylic acid, methacrylic acid, and crotonic acid, and derivatives thereof, as well as dicarboxylic acids such as maleic acid, fumaric acid, itaconate, and citraconate, and anhydrides and derivatives thereof. These may be used singly or as a combination of two or more thereof. Among others, dicarboxylic acids are preferable, and maleic acid is particularly preferable.

Furthermore, the coating solution may contain a dispersing agent, viscosity improver, stabilization agent, antifoam agent, leveling agent and the like, as required.

Dispersion of the coating solution may be realized by a generally known method. Good methods include the use of a ball mill, bead mill, sand mill, roll mill, homogenizer, ultrasonic homogenizer, high pressure homogenizer, ultrasonic apparatus, and paint shaker. The dispersion step may be carried out in several stages using a plurality of these mixing and dispersing devices in combination.

There are no specific limitations on the order of the coating solution preparation steps. From the viewpoint of designing an efficient dispersion step, it is preferable to mix and dissolve aromatic polyamide in an aprotic organic polar solvent and add alumina and other organic resins and additives to prepare a coating solution.

Then, a porous base is coated with the resulting coating solution, immersed in a water tank, and dried to form a porous coat layer. The coating may be achieved by a generally known method. Useful examples include dip coating, gravure coating, slit die coating, knife coating, comma coating, kiss coating, roll coating, bar coating, spray coating, immersed coating, spin coating, screen printing, ink jet printing, pad printing, and other printing techniques. There are no limitations on them and an appropriate method may be selected to meet preferred conditions for the fluorine resin, organic resin, inorganic particles, binder, dispersing agent, leveling agent, solvent, base material and the like to use. To increase the coatability, furthermore, the surface of the porous base to coat may be subjected to surface treatment such as, for example, corona treatment and plasma treatment.

In the porous layer, the heat resistant resin preferably accounts for 1 mass % or more and less than 50 mass %, more preferably 2 mass % or more and less than 30 mass %, of the entire porous layer, which accounts for 100 mass %. The content is more preferably 3 mass % or more and less than 15 mass %. When a plurality of porous layers are included, each of the porous layers should meet the requirements.

If the content of the heat resistant resin in the porous layer is less than 1 mass %, a sufficiently large resistance to thermal breakage cannot be realized in some instances. If it is 50 mass % or more, the content of the heat resistant resin will be too large and sufficiently developed porous structures will not be present in some instances, leading to deterioration in battery characteristics. In addition, there will occur cost-related disadvantages in some instances. When there exist a plurality of porous layers, it is preferable that the heat resistant resin accounts for 1 mass % or more and less than 50 mass % in at least one of the individual layers and it is preferable that the heat resistant resin accounts for 1 mass % or more and less than 50 mass % in all porous layers.

The porous layer preferably has a thickness of 1 µm or more and 8 µm or less. It is more preferably 1.5 µm or more and 6 µm or less. It is still more preferably 2 µm or more and 5 µm or less. The thickness of the porous layer as referred to in a porous film that includes a porous base having a porous layer on one side means the thickness of that porous layer whereas in a porous film that includes a porous base having porous layers on both sides, it means the sum of the thicknesses of the two porous layers. If the thicknesses of the porous layer is less than 1 µm, a sufficiently large resistance to thermal breakage cannot be realized in some instances. If it is more than 6 µm, on the other hand, sufficiently developed porous structures will not be present in some instances, possibly leading to deterioration in battery characteristics. In addition, there will occur cost-related disadvantages in some instances. When porous layers are present on both sides of a porous base, it is preferable for the sum of the thicknesses of the two porous layers to be 1 µm or more and 8 µm or less.

The increase in air permeability resulting from the existence of the porous layer is preferably 250 seconds/100 cc or less. It is more preferably 200 seconds/100 cc or less. Here, the increase in air permeability resulting from the addition of the porous layer is calculated by subtracting the air permeability of the porous base itself from that of the porous film provided with the porous layer and it represents the increase in air permeability resulting from the existence of the porous layer. If the increase in air permeability resulting from the existence of the porous layer is more than 250 seconds/100 cc, the battery characteristics will deteriorate in some instances.

Porous Base

Examples of the porous base include porous films having pores inside, nonwoven fabrics, and porous film sheets of fibrous materials. With respect to the primary constituent, the porous base is preferably composed mainly of a resin having electrical insulating properties, electric stability, and stability in electrolytes. To allow the resin to have a shutdown function, it is preferably a thermoplastic resin having a melting point of 200° C. or less. This shutdown function serves, in the event of abnormal heat generation in a lithium ion battery, such that the resin is melted by heat so that the porous structure will be closed to halt the ion migration, thereby stopping the power generation.

The thermoplastic resin may be, for example, a polyolefin based resin, and the porous base is preferably a polyolefin based porous base. With respect to the polyolefin based porous base, it is more preferable that the polyolefin based porous base has a melting point of 200° C. or less. Specific examples of the polyolefin resin include polyethylene, polypropylene, copolymers thereof, and mixtures prepared by combination thereof, which may be in the form of, for example, a monolayer porous base containing 90 mass % or more of polyethylene or a multi-layered porous base formed of polyethylene and polypropylene.

Available production methods for porous bases include a method in which a polyolefin resin is processed into a sheet, which is then stretched to make it porous and a method in which a polyolefin resin is dissolved in a solvent such as liquid paraffin and processed into a sheet, followed by removing the solvent to make it porous.

It is preferable for the porous base to have a thickness of 3 µm or more and 50 µm or less, more preferably 5 µm or more and 30 μm or less. If the porous base has a thickness of more than 50 μm, the porous base will have a large internal resistance in some instances. On the other hand, a porous base having a thickness of less than 3 μm will be difficult to produce and fail to have sufficient mechanical characteristics in some instances.

It is preferable for the porous base to have an air permeability of 50 seconds/100 cc or more and 1,000 seconds/100 cc or less. It is still more preferably 50 seconds/100 cc or more and 500 seconds/100 cc or less. If the air permeability is more than 1,000 seconds/100 cc, sufficient ion migration will not be realized in some instances, possibly leading to deterioration in battery characteristics. If it is less than 50 seconds/100 cc, sufficient mechanical characteristics will not be realized in some instances.

Porous Film

The porous film includes a porous base having a porous layer as described above at least on one side thereof. It is preferable for the porous layer to be sufficiently porous to have ion permeability, and it is preferable for the porous film to have an air permeability of 50 seconds/100 cc or more and 1,000 seconds/100 cc or less. It is more preferably 50 seconds/100 cc or more and 500 seconds/100 cc or less. It is still more preferably 50 seconds/100 cc or more and 300 seconds/100 cc or less. If the air permeability is more than 1,000 seconds/100 cc, sufficient ion migration will not be realized in some instances, possibly leading to deterioration in battery characteristics. If it is less than 50 seconds/100 cc, sufficient mechanical characteristics will not be realized in some instances.

Secondary Battery

The porous film can be used suitably for the separators of secondary batteries such as lithium ion battery. A lithium ion battery contains a positive electrode formed by laying a positive electrode active material on a positive electrode collector and a negative electrode formed by laying a negative electrode active material on a negative electrode collector, with a secondary battery separator and an electrolyte interposed between them.

In the positive electrode, a positive electrode material containing an active material, binder resin, and conductive assistant is laid over a collector, and the active material is, for example, a lithium-containing transition metal oxide such as $LiCoO_2$, $LiNiO_2$, and $Li(NiCoMn)O_2$ that has a layer-like structure, a spinel type manganese oxide such as $LiMn_2O_4$, or an iron based compound such as $LiFePO_4$. The binder resin may be a highly oxidation resistant resin. Specific examples include fluorine resin, acrylic resin, and styrene-butadiene resin. As the conductive assistant, carbon materials such as carbon black and graphite are used. The collector is preferably in the form of metal foil, and in particular, aluminum foil is used widely.

In the negative electrode, a negative electrode material containing an active material and binder resin is laid over a collector, and the active material is, for example, a carbon material such as artificial graphite, natural graphite, hard carbon, and soft carbon, a lithium alloy based material of tin, silicon and the like, a metal material such as Li, or lithium titanate ($Li_4Ti_5O_{12}$). Fluorine resin, acrylic resin, or styrene-butadiene resin is used as the binder resin. The collector is preferably in the form of metal foil, and in particular, copper foil is used widely.

The electrolyte gives a space in which ions migrate between the positive electrode and the negative electrode in the secondary battery, and it consists mainly of an electrolyte substance dissolved in an organic solvent. Examples of the electrolyte substance include $LiPF_6$, $LiBF_4$, and $LiClO_4$, of which $LiPF_6$ is preferred from the viewpoint of the solubility in organic solvents and the ion conductance. Examples of the organic solvent include ethylene carbonate, propylene carbonate, fluoroethylene carbonate, dimethyl carbonate, diethyl carbonate, ethylmethyl carbonate, γ-butyrolactone, and sulfolane, and these organic solvents may be used as a mixture of two or more thereof.

As a method of producing a secondary battery, first an active material and a conductive assistant are dispersed in a binder solution to prepare a coating solution for electrode formation and this coating solution is spread over a collector, followed by drying to remove the solvent to provide a positive electrode or a negative electrode. After the drying step, the coat film preferably has a film thickness of 50 μm or more and 500 μm or less. A secondary battery separator is sandwiched between the resulting positive electrode and negative electrode in such a manner that it comes in contact with the active material layer of each electrode and then they are enclosed in a covering material such as aluminum laminate film. Subsequently, an electrolyte is injected, and a negative electrode lead and safety valves are attached, followed by sealing the covering material. The secondary battery thus obtained has both a large resistance to thermal breakage and good battery characteristics, and its production can be carried out at low cost.

EXAMPLES

Our previous films, battery separator and batteries are more specifically explained below with reference to Examples, but this disclosure is not limited thereby. The measuring methods used in these Examples are described below.

Measurement Methods (1) Surface Hole Area Rate α and Cross-Sectional Porosity β

For the measurement of the surface hole area rate α, a sample was prepared by ion coating on the surface of a porous film using an ion coater. For the measurement of the cross-sectional porosity β, on the other hand, a porous film was frozen with liquid nitrogen and an argon beam was applied from above to prepare a cross section (Cryo-BIB method). Then, ion coating was performed on the cross section using an ion coater to prepare a sample for the measurement. The resulting sample was observed by an S-4800 field emission type scanning electron microscope (FE-SEM) manufactured by Hitachi High-Technologies Corporation at an accelerating voltage of 1.5 kV and photographic image data (observed images alone without scale bars etc. included) of the surface (magnification of 20,000) and the cross section (magnification of 40,000) were obtained. Each of the resulting images was trimmed to leave only the porous layer portion and subjected to image analysis by using HALCON Ver.10.0 provided by MVTec to determine the surface hole area rate α (%) and the cross-sectional porosity β (%). For the image analysis, first a 11 pixel average image A and a 3 pixel average image B were produced for a 256-level gradation monochrome image, and the area of the entire image B (Area_all) was calculated.

Then, the image A was subtracted from the image B to provide an image C, and regions D where brightness ≥10 were extracted. The regions D thus extracted were divided into parts each containing a lump, and regions E where the area ≥100 were extracted. For a region E, a region F closing-treated by 2.5 pixel radius circular elements was produced, and a region G opening-treated by transverse 1 pixel×longitudinal 5 pixel rectangular elements was produced, thereby removing pixel parts with a longitudinal size <5. The regions G thus extracted were divided into parts each containing a lump, and regions H where the area ≥500 were extracted, thereby extracting fibril regions.

In the image C, furthermore, regions I where the image ≥5 were extracted, and the regions I were divided into parts each containing a lump, thereby extracting regions J where the area ≥300. For a region J, a region K opening-treated by 1.5 pixel radius circular elements and subsequently closing-treated by 8.5 pixel radius circular elements was produced. Then, for the region K, regions L where the area ≥200 were extracted. In a region L, regions M where dark sections where the area ≥4,000 pixels were filled with bright sections were produced, thereby extracting non-opened regions other than fibrils.

Finally, a sum region N of the region H and the region M was produced, and the area (Area_closed) of the sum region N was calculated to determine the area of the non-opened region. Here, the surface hole area rate α and the cross-sectional porosity β were calculated by the equation. Surface hole area rate α, cross-sectional porosity β (%)=(Area_all−Area_closed)/Area_all×100

From the surface hole area rate α and the cross-sectional porosity β thus determined, the α/β ratio was calculated by the equation.

$$\alpha/\beta(\%) = \text{surface hole area rate } \alpha(\%)/\text{cross-sectional porosity } \beta(\%) \times 100$$

Measurements were taken by the above method at 10 points on each of the two surfaces of a porous film and the average was adopted as the α/β rate (%) of the sample.

(2) Thermal Film Breakage Temperature

A porous film specimen with a size of 50 mm×50 mm was cut out and sandwiched between two stainless steel plates, each having a 12 mm through-hole at the center, and the entire stack was sandwiched between two heating block plates, each having a 12 mm through-hole at the center. A tungsten ball with a diameter of 9.5 mm was placed on the specimen exposed in the through-hole and the heating blocks were heated at a rate of 5° C./min to determine the temperature when the ball fell. Measurements were taken from five 50 mm×50 mm specimens and the average was adopted as the thermal film breakage temperature. The film was rated as x when it was less than 160° C., Δ when it was 160° C. or more and less than 200° C., ○ when it was 200° C. or more and less than 250° C., and ⊚ when it was 250° C. or more.

(3) Intrinsic Viscosity (η)

In N-methyl pyrrolidone (NMP) containing 2.5 mass % lithium bromide (LiBr), a polymer was dissolved to a concentration of 0.5 g/dl and the efflux time was measured at 30° C. using an Ubbelohde viscometer. A blank NMP solution free of the polymer was also subjected to the same efflux time measurement to determine the intrinsic viscosity (η) (dl/g) by the equation.

$$\text{Intrinsic viscosity}(\eta)(\text{dl/g}) = [\ln(t/t0)]/0.5$$

t0: efflux time (seconds) of blank
t: efflux time (seconds) of sample (4) Production of Battery To produce a positive electrode sheet, 92 parts by mass of $Li(Ni_{5/10}Mn_{2/10}Co_{3/10})O_2$ as positive electrode active material, 2.5 parts by mass each of acetylene black and graphite as positive electrode conductive assistants, and 3 parts by mass of polyvinylidene fluoride as positive electrode binder were dispersed in N-methyl-2-pyrrolidone using a planetary mixer to prepare a positive electrode slurry, and aluminum foil was coated with it, dried, and rolled (coating weight: 9.5 mg/cm$^2$).

This positive electrode sheet was cut to provide a 40 mm×40 mm specimen. This step was carried out in such a manner that a 5 mm×5 mm tab adhering portion for collector free of an active material layer protruded out of the active material face. An aluminum tab with a width of 5 mm and a thickness of 0.1 mm was attached to the tab adhering portion by ultrasonic welding.

To produce a negative electrode sheet, 98 parts by mass of natural graphite as negative electrode active material, 1 part by mass of carboxymethyl cellulose as viscosity improver, and 1 part by mass of a styrene-butadiene copolymer as negative electrode binder were dispersed in water using a planetary mixer to prepare a negative electrode slurry, and copper foil was coated with it, dried, and rolled (coating weight: 5.5 mg/cm$^2$).

This negative electrode sheet was cut to provide a 45 mm×45 mm specimen. This step was carried out in such a manner that a 5 mm×5 mm tab adhering portion for collector free of an active material layer protruded out of the active material face. A copper tab of the same size as the positive electrode tab was attached to the tab adhering portion by ultrasonic welding.

Then, the porous film was cut to provide a 55 mm×55 mm specimen, and the porous film specimen was sandwiched between the positive electrode and negative electrode prepared above such that the active material layers were separated by the porous film. In this way, a group of electrodes was prepared in such a manner that all positive electrode coated portions were opposed to the negative electrode coated portions. A positive electrode, negative electrode, and porous film as prepared above were wrapped in a 90 mm×200 mm aluminum laminate film and the long sides of the aluminum laminate film were folded. Then, the long sides of the aluminum laminate film were heat-sealed to form a bag.

A 1:1 (volume ratio) mixed solvent of ethylene carbonate and diethyl carbonate was prepared and a $LiPF_6$ solute was dissolved to a concentration of 1 mole/liter to produce an electrolyte. Then, 1.5 g of the electrolyte was put in the bag of aluminum laminate film and, while performing impregnation under reduced pressure, the short sides of the aluminum laminate film were heat-sealed to provide a laminate type battery.

(5) Discharge Load Characteristics

Test for discharge load characteristics was carried out by the following procedure and they were evaluated in terms of the discharge capacity retention rate.

For laminate type batteries as prepared above, the discharge capacity was measured when electric discharge was performed at 25° C. and 0.5 C, and the discharge capacity was also measured when electric discharge was performed at 10 C, followed by calculating the discharge capacity retention rate as (discharge capacity at 10 C)/(discharge capacity at 0.5 C)×100. Here, charging was performed under the condition of constant current charging at 0.5 C and 4.3 V whereas discharging was performed under the condition of constant current discharging at 2.7 V. Five such laminate type batteries were prepared, and the one giving the maximum discharge capacity retention rate and the one giving the minimum discharge capacity retention rate were omitted, followed by calculating the average of the remaining three discharge capacity retention rate measurements. A specimen was rated as x when the discharge capacity retention rate was less than 55%, ○ when it was 55% or more and less than 65%, and ⊚ when it was 65% or more.

(6) Charge-Discharge Cycle Characteristics

Test for charge-discharge cycle characteristics was carried out by the following procedure and they were evaluated in terms of the discharge capacity retention rate.

1st to 300th Cycle

One cycle consisted of one charge step and one discharge step, and this charge-discharge cycle was repeated 300 times at 25° C. under the charging condition of constant current charging at 2 C and 4.3 V and the discharging condition of constant current discharging at 2 C and 2.7 V.

Calculation of Discharge Capacity Retention Rate

The discharge capacity retention rate was calculated as (discharge capacity in 300th cycle)/(discharge capacity in 1st cycle)×100. Five such laminate type batteries were prepared, and the one giving the maximum discharge capacity retention rate and the one giving the minimum discharge capacity retention rate were omitted, followed by calculating the average of the remaining three capacity retention rate measurements. A specimen was rated as x when the discharge capacity retention rate was less than 60%, ○ when it was 60% or more and less than 70%, and ⊚ when it was 70% or more.

Example 1

In dehydrated N-methyl-2-pyrrolidone, 2-chloro-1,4-phenylene diamine and 4,4'-diaminodiphenyl ether were dissolved in amounts corresponding to 85 mol % and 15 mol %, respectively, of the total amount of diamine. To this, as an acid dichloride component, 2-chloroterephthaloyl chloride was added in an amount corresponding to 99 mol % of the total amount of diamine, followed by stirring to polymerize an aromatic polyamide. The resulting polymerization reaction solution was neutralized with lithium carbonate in an amount corresponding to 97 mol % of the total amount of acid dichloride, and further neutralized with diethanol amine in an amount corresponding to 15 mol % and triethanol amine in an amount corresponding to 25 mol % to provide an aromatic polyamide solution having an aromatic polyamide concentration of 10 mass %. The aromatic polyamide resin had an intrinsic viscosity ($\eta$) of 4.3 dl/g.

To the resulting aromatic polyamide solution, N-methyl-2-pyrrolidone was added and, furthermore, alumina particles (average particle diameter 0.4 μm) were added in such manner that aromatic polyamide accounted for 10 parts by mass relative to the total amount of aromatic polyamide and alumina particles, which accounted for 100 parts by mass. The mixed solution was preliminarily dispersed with a stirring device and dispersed with a bead mill to provide a coating solution.

The resulting coating solution was spread over both surfaces of a polyethylene porous base (with a thickness of 5 μm and a permeability of 120 seconds/100 cc) by a dip coater, subsequently immersed in a water tank, and dried to ensure volatilization of the solvent contained to form a porous layer, thereby providing a porous film. The resulting porous film was examined to determine the surface hole area rate of the porous layer, cross-sectional porosity, total film thickness of the porous layers present on both sides, thermal breakage temperature, discharge load characteristics, and charge-discharge cycle characteristics, and results are given in Table 1.

Example 2

Except that the aromatic polyamide accounted for 5 parts by mass relative to the total amount of aromatic polyamide and alumina particles, which accounted for 100 parts by mass, and that the surface hole area rate and the cross-sectional porosity were 15% and 68%, respectively, the same procedure as in Example 1 was carried out to produce a porous film.

Example 3

Except that the total film thickness of the porous layers present on both sides was 3.0 μm, the same procedure as in Example 1 was carried out to produce a porous film.

Example 4

Except that the total film thickness of the porous layers present on both sides was 1.5 μm, the same procedure as in Example 1 was carried out to produce a porous film.

Example 5

Except that the total film thickness of the porous layers present on both sides was 7.0 μm, the same procedure as in Example 1 was carried out to produce a porous film.

Example 6

Except that the surface hole area rate and the cross-sectional porosity were 15% and 68%, respectively, and that the total film thickness of the porous layers present on both sides was 3.5 μm, the same procedure as in Example 1 was carried out to produce a porous film.

Example 7

Except that the aromatic polyamide accounted for 20 parts by mass relative to the total amount of aromatic polyamide and alumina particles, which accounted for 100 parts by mass, and that the surface hole area rate and the cross-sectional porosity were 5% and 50%, respectively, the same procedure as in Example 1 was carried out to produce a porous film.

Example 8

Except that the aromatic polyamide accounted for 35 parts by mass relative to the total amount of aromatic polyamide and alumina particles, which accounted for 100 parts by mass, and that the surface hole area rate and the cross-sectional porosity were 2% and 40%, respectively, the same procedure as in Example 1 was carried out to produce a porous film.

Example 9

Except that the surface hole area rate and the cross-sectional porosity were 15% and 66%, respectively, the same procedure as in Example 1 was carried out to produce a porous film.

Example 10

Except that the aromatic polyamide resin had an intrinsic viscosity (η) of 5.1 dl/g and that the total film thickness of the porous layers present on both sides was 2.0 μm, the same procedure as in Example 1 was carried out to produce a porous film.

Example 11

Except that the aromatic polyamide resin had an intrinsic viscosity (η) of 3.5 dl/g, that the aromatic polyamide accounted for 50 parts by mass relative to the total amount of aromatic polyamide and alumina particles, which accounted for 100 parts by mass, and that the surface hole area rate and the cross-sectional porosity were 50% and 60%, respectively, the same procedure as in Example 1 was carried out to produce a porous film.

Example 12

Except that the aromatic polyamide resin had an intrinsic viscosity (η) of 2.5 dl/g and that the surface hole area rate and the cross-sectional porosity were 40% and 70%, respectively, the same procedure as in Example 1 was carried out to produce a porous film.

Example 13

Except that the aromatic polyamide resin had an intrinsic viscosity (η) of 2.0 dl/g, the same procedure as in Example 1 was carried out to produce a porous film.

Example 14

Except that the aromatic polyamide resin had an intrinsic viscosity (η) of 3.0 dl/g, the same procedure as in Example 1 was carried out to produce a porous film.

Comparative Example 1

Except that the surface hole area rate and the cross-sectional porosity were 50% and 55%, respectively, the same procedure as in Example 1 was carried out to produce a porous film.

Comparative Example 2

Except that the aromatic polyamide accounted for 3 parts by mass relative to the total amount of aromatic polyamide and alumina particles, which accounted for 100 parts by mass, and that the surface hole area rate and the cross-sectional porosity were 65% and 65%, respectively, the same procedure as in Example 1 was carried out to produce a porous film.

Comparative Example 3

Except that the aromatic polyamide accounted for 20 parts by mass relative to the total amount of aromatic polyamide and alumina particles, which accounted for 100 parts by mass, and that the surface hole area rate and the cross-sectional porosity were 60% and 55%, respectively, the same procedure as in Example 1 was carried out to produce a porous film.

TABLE 1

| | Intrinsic viscosity (η) of aromatic polyamide resin (dl/g) | Content of heat resistant resin (mass %) | Surface hole area rate (%) | Cross-sectional porosity (%) | Surface hole area rate/cross-sectional porosity (α/β) (%) | Total film thickness of porous layers on both sides (μm) | Thermal breakage temperature | Discharge load characteristics | Charge-discharge cycle characteristics |
|---|---|---|---|---|---|---|---|---|---|
| Example 1 | 4.3 | 10 | 8 | 63 | 13 | 4.0 | ◎ | ◎ | ◎ |
| Example 2 | 4.3 | 5 | 15 | 68 | 22 | 4.0 | ○ | ◎ | ◎ |
| Example 3 | 4.3 | 10 | 8 | 63 | 13 | 3.0 | ◎ | ◎ | ◎ |
| Example 4 | 4.3 | 10 | 8 | 63 | 13 | 1.5 | ○ | ◎ | ◎ |
| Example 5 | 4.3 | 10 | 8 | 63 | 13 | 7.0 | ◎ | ○ | ○ |
| Example 6 | 4.3 | 10 | 25 | 60 | 42 | 3.5 | Δ | ◎ | ◎ |
| Example 7 | 4.3 | 20 | 5 | 50 | 10 | 4.0 | ◎ | ○ | ○ |
| Example 8 | 4.3 | 35 | 2 | 40 | 5 | 4.0 | ◎ | Δ | Δ |
| Example 9 | 4.3 | 10 | 15 | 66 | 23 | 4.0 | ○ | ◎ | ◎ |
| Example 10 | 5.1 | 10 | 8 | 63 | 13 | 2.0 | ◎ | ◎ | ◎ |
| Example 11 | 3.5 | 50 | 50 | 60 | 83 | 4.0 | Δ | ○ | ○ |
| Example 12 | 2.5 | 10 | 40 | 70 | 57 | 4.0 | Δ | ◎ | ◎ |
| Example 13 | 2.0 | 10 | 8 | 63 | 13 | 4.0 | Δ | ◎ | ◎ |
| Example 14 | 3.0 | 10 | 8 | 63 | 13 | 4.0 | ○ | ◎ | ◎ |
| Comparative Example 1 | 4.3 | 10 | 50 | 55 | 91 | 4.0 | X | ◎ | ◎ |
| Comparative Example 2 | 4.3 | 3 | 65 | 65 | 100 | 4.0 | X | ◎ | ◎ |
| Comparative Example 3 | 4.3 | 20 | 60 | 55 | 109 | 4.0 | X | ◎ | ◎ |

It is seen in Table 1 that for the porous film obtained in each of Examples 1 to 14, the porous base had a porous layer at least on one side and that the surface hole area rate of the porous layer is 50% or less of the cross-sectional porosity of the porous layer, leading to a sufficiently large resistance to thermal breakage and good battery characteristics.

In Comparative Examples 1 to 3, on the other hand, the surface hole area rate is large and the cross-sectional porosity is also large, making it impossible to obtain a sufficiently large resistance to thermal breakage although good battery characteristics were obtained.

The invention claimed is:

1. A secondary battery separator comprising a porous film comprising a porous base having a porous layer at least on one side, the porous layer having an α/β ratio of 30% or less and α is 20% or less, wherein α is a surface hole area rate, β is a cross-sectional porosity of the porous layer, and the porous layer contains a heat resistant resin having an intrinsic viscosity (η) of 3.6 dl/g or more and 8.0 dl/g or less.

2. The secondary battery separator comprising the porous film as set forth in claim 1, wherein the porous layer has a cross-sectional porosity β of 40% or more and 80% or less.

3. The secondary battery separator comprising the porous film as set forth in claim 1, wherein the heat resistant resin is at least one resin selected from the group consisting of polyamide, polyamide-imide, and polyimide.

4. The secondary battery separator comprising the porous film as set forth in claim 1, wherein the heat resistant resin contains aromatic polyamide having a structure as represented by formula (1):

—NH—Ar$^1$—NH—CO—Ar$^2$—CO—  (1)

where Ar$^1$ and Ar$^2$ each represent an aromatic group.

5. The secondary battery separator comprising the porous film as set forth in claim 1, wherein the porous layer contains inorganic particles.

6. The secondary battery separator comprising the porous film as set forth claim 1, wherein the heat resistant resin accounts for 1 mass % or more and less than 50 mass % in 100 mass % of the porous layer.

7. A secondary battery comprising the secondary battery separator as set forth in claim 1.

8. The secondary battery separator comprising the porous film as set forth in claim 1, wherein the porous layer has a cross-sectional porosity β of 40% or more and 80% or less.

9. The secondary battery separator comprising the porous film as set forth in claim 1, wherein the porous layer contains a heat resistant resin.

10. The secondary battery separator comprising the porous film as set forth in claim 2, wherein the porous layer contains a heat resistant resin.

11. The secondary battery separator comprising the porous film as set forth in claim 3, wherein the heat resistant resin contains aromatic polyamide having a structure as represented by formula (1):

—NH—Ar$^1$—NH—CO—Ar$^2$—CO—  (1)

where Ar$^1$ and Ar$^2$ each represent an aromatic group.

* * * * *